(12) United States Patent  (10) Patent No.: US 9,333,940 B2
Hicken et al.  (45) Date of Patent: May 10, 2016

(54) FRONTAL AIRBAG SYSTEMS AND USES THEREOF

(71) Applicant: Autoliv ASP, Inc., Ogden, UT (US)

(72) Inventors: Paul Hicken, Syracuse, UT (US); Xiaohong Wang, Roy, UT (US); Takayuki Makioka, Roy, UT (US); Hideaki Tanaka, South Ogden, UT (US); Leron DuWayne Lechtenberg, Riverdale, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/470,763

(22) Filed: Aug. 27, 2014

(65) Prior Publication Data

US 2016/0059821 A1 Mar. 3, 2016

(51) Int. Cl.
*B60R 21/2338* (2011.01)
*B60R 21/33* (2006.01)
*B60R 21/205* (2011.01)
*B60R 21/231* (2011.01)
*B60R 21/00* (2006.01)

(52) U.S. Cl.
CPC .............. *B60R 21/33* (2013.01); *B60R 21/205* (2013.01); *B60R 21/2338* (2013.01); *B60R 2021/0004* (2013.01); *B60R 2021/0009* (2013.01); *B60R 2021/23107* (2013.01)

(58) Field of Classification Search
CPC ................... B60R 21/2338; B60R 2021/0009; B60R 2021/23384
See application file for complete search history.

(56) References Cited

U.S. PATENT DOCUMENTS

| 6,254,130 | B1 | 7/2001 | Jayaraman et al. |
| 6,315,323 | B1 | 11/2001 | Pack, Jr. |
| 8,157,291 | B2 | 4/2012 | Mayer et al. |
| 8,882,138 | B1 * | 11/2014 | Hicken ................. B60R 21/231 280/730.1 |
| 2004/0012180 | A1 | 1/2004 | Pinsenschaum et al. |
| 2004/0104564 | A1 | 6/2004 | Hawthorn et al. |
| 2006/0131846 | A1 | 6/2006 | Abe |
| 2006/0186656 | A1 | 8/2006 | Kumagai |
| 2007/0205590 | A1 * | 9/2007 | Klinkenberger ...... B60R 21/233 280/743.2 |
| 2007/0228710 | A1 * | 10/2007 | Ishiguro ................ B60R 21/203 280/743.2 |
| 2009/0230663 | A1 * | 9/2009 | Mills ..................... B60R 21/233 280/735 |
| 2010/0244417 | A1 * | 9/2010 | Yamazaki .............. B60R 21/01 280/736 |

(Continued)

FOREIGN PATENT DOCUMENTS

DE 102007032763 A1 * 1/2008 ........... B60R 21/233
EP 1693256 A1 8/2006

(Continued)

OTHER PUBLICATIONS

Kazuaki Bito, Automotive airbag has harness with side-release mechanism for asymmetric impact, Jan. 24, 2008, German Patent Office, DE 10 2007 032 763 A1, English Abstract.*

(Continued)

*Primary Examiner* — James English
(74) *Attorney, Agent, or Firm* — Stoel Rives LLP (57) ABSTRACT

An inflatable airbag system can be configured to be mounted to a frontal region of a vehicle. The inflatable airbag system includes an airbag and a positioning member, and is configured to deploy in various configurations in response to frontal and oblique collision events. The positioning member can include a tether or an inflatable member.

10 Claims, 8 Drawing Sheets

(56) References Cited

U.S. PATENT DOCUMENTS

| | | | |
|---|---|---|---|
| 2012/0242070 A1* | 9/2012 | Paxton | B60R 21/2238 280/743.2 |
| 2013/0093170 A1* | 4/2013 | Mendez | B60R 21/2338 280/743.2 |
| 2014/0232093 A1 | 8/2014 | Jacqmarcq et al. | |
| 2015/0274116 A1* | 10/2015 | Jaradi | B60R 21/0136 701/45 |

FOREIGN PATENT DOCUMENTS

| | | |
|---|---|---|
| JP | 2006256508 A | 9/2006 |
| JP | 2007055501 A | 3/2007 |

OTHER PUBLICATIONS

Kazuaki Bito, Automotive airbag has harness with side-release mechanism for asymmetric impact, Jan. 24, 2008, German Patent Office, DE 10 2007 032 763 A1, Machine Translation of Description.*

International Search Report and Written Opinion for PCT/US2015/046019 mailed Nov. 6, 2015.

* cited by examiner

FRONTAL AIRBAG SYSTEMS AND USES THEREOF

TECHNICAL FIELD

The present disclosure relates generally to the field of automotive protective systems. More specifically, the present disclosure relates to frontal airbag systems that are configured to deploy in various configurations in response to frontal and oblique collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

Inflatable airbag systems are widely used to minimize occupant injury in a collision scenario. Airbag modules or assemblies have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" generally refers to a frontal airbag.

Frontal airbags are typically installed in the steering wheel and/or instrument panel of a vehicle. During installation, the airbags are rolled, folded, or both, and are retained in the rolled/folded state behind a cover. During a collision event, vehicle sensors trigger the activation of an inflator, which rapidly fills the airbag with inflation gas. The airbag rapidly changes conformations from the rolled/folded configuration to an expanded or deployed configuration. As disclosed herein, the expanded or deployed configuration of the airbag may be at least partially determined by one or more positioning members. For example, through use of a positioning member, the airbag can deploy in a first configuration in response to a frontal collision event and a second configuration in response to an oblique collision event. In some embodiments, the positioning member comprises one or more tethers. In other embodiments, the positioning member comprises an inflatable member.

Figure 1:
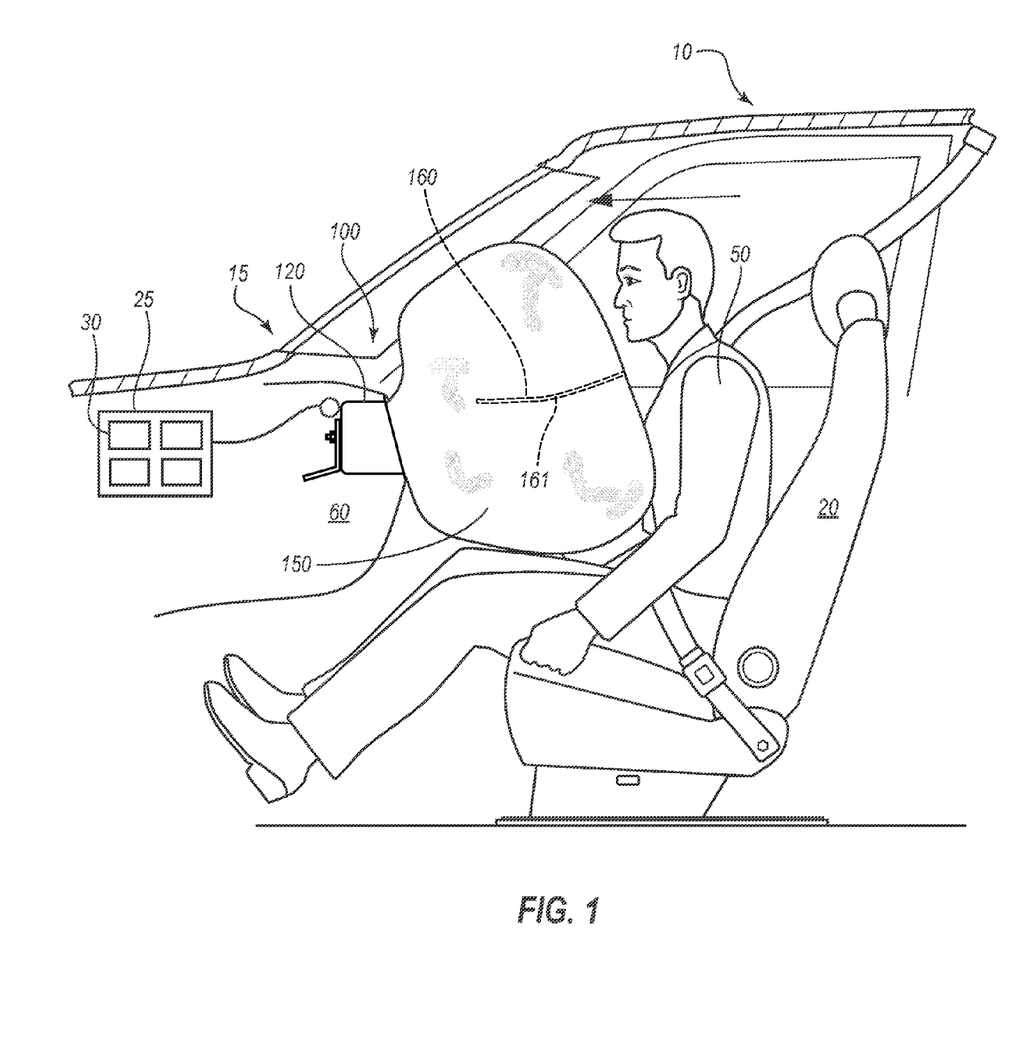
FIG. 1 is a perspective view of an interior side of a vehicle having an inflatable airbag system depicted in a deployed configuration, according to one embodiment of the present disclosure.

FIG. 1 depicts a perspective view of an interior of a vehicle 10, in which an occupant 50 is seated on a seat 20. The inflatable airbag assembly 100 is mounted in the vehicle 10, and depicted in a deployed configuration. As can be appreciated, the deployed configuration can also be referred to as a deployed state, inflated state, or inflated configuration. The inflatable airbag system 100 comprises an airbag (or inflatable airbag cushion) 150, a housing 120, and a positioning member 160. The positioning member 160 comprises a tether 161 that is disposed in the interior of the airbag 150.

As shown in FIG. 1, the inflatable airbag system 100 can be configured to be mounted to a frontal region 15 of the vehicle 10. For example, in the illustrated embodiment, the inflatable airbag system 100 is mounted in an instrument panel 60 on the passenger side of the vehicle 10. In other embodiments, the inflatable airbag system 100 can be mounted on the driver's side of a vehicle 10, for example, in the steering wheel.

Figure 2B:
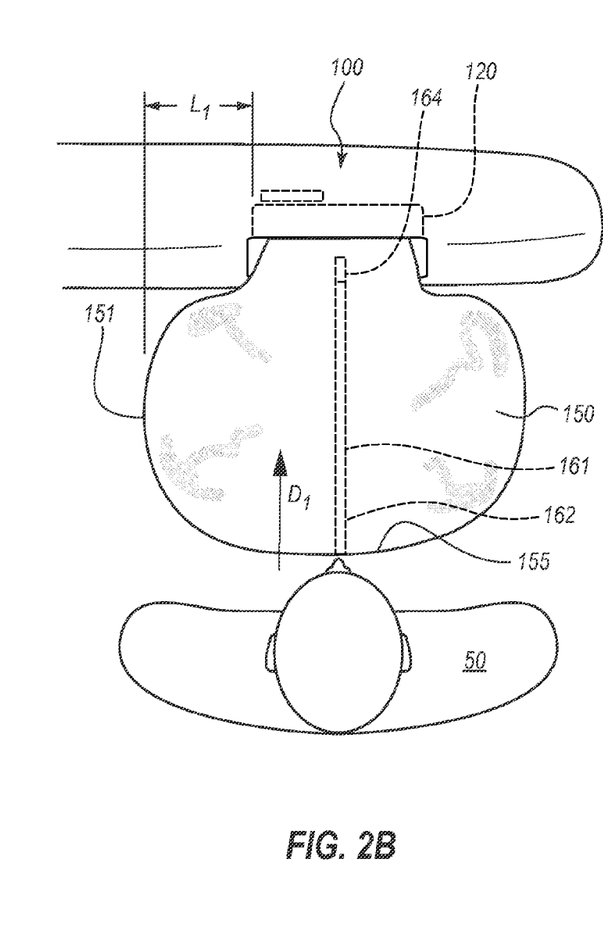
FIG. 2B is another top view of the inflatable airbag system of FIG. 1, depicting the airbag deployed in a first configuration in response to a frontal collision event.
Figure 3A:
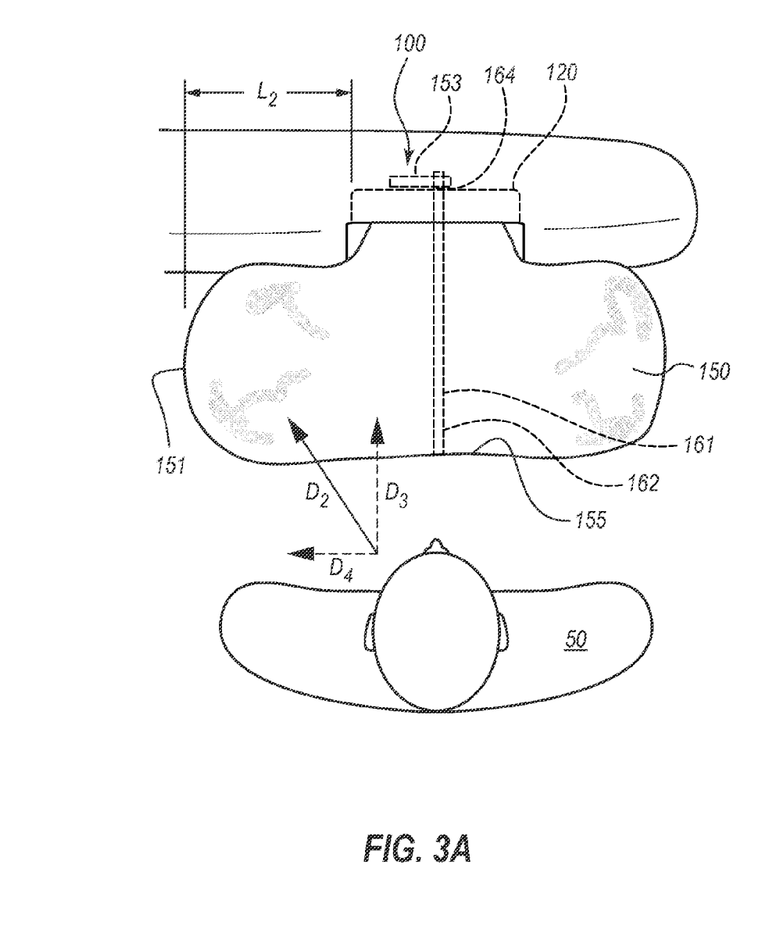
FIG. 3A is another top view of the inflatable airbag system of FIG. 1, depicting the airbag deployed in a second configuration in response to an oblique collision event.
Figure 3B:
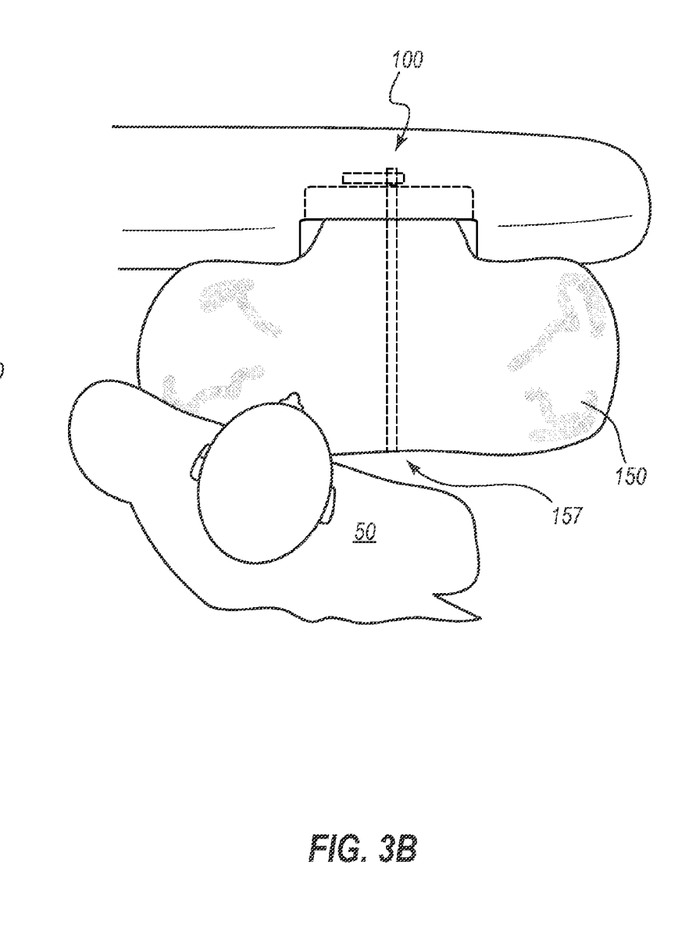
FIG. 3B is another top view of the inflatable airbag system of FIG. 1, depicting the airbag deployed in a second configuration in response to an oblique collision event.

The airbag 150 is configured to be deployed in various modes or configurations. For example, as shown in FIG. 2B, the airbag 150 is configured to deploy in a first configuration in response to a frontal, or substantially frontal, collision event. As shown in FIGS. 3A-3B, the airbag 150 is further configured to deploy in a second configuration in response to an oblique collision event.

With continued reference to FIG. 1, in some embodiments, before or during deployment of the airbag 150, an electronic signal may be sent from a control unit 25, which is coupled to and/or includes one or more vehicle sensors 30, to electronically signal the type of collision event that has occurred. For example, if the sensors 30 signal a frontal collision event, the airbag 150 will deploy in the first configuration. If the sensors 30 signal an oblique collision event, the airbag 150 will deploy in the second configuration. Various types of sensors can be used, including, but not limited to, deceleration sensors, mechanical inertia sensors, and accelerometers.

In some embodiments, multiple sensors (e.g., accelerometers) can be used to detect the forces caused by the collision event. For example, a first sensor can sense or detect the amount of longitudinal impact applied to the vehicle, and a second sensor can sense or detect the amount of lateral impact applied to the vehicle. In such embodiments, the first sensor can send a signal to the control unit when a threshold amount of longitudinal impact is detected, and the second sensor can send a signal to the control unit when a threshold amount of lateral impact is detected. In some embodiments, the impact from a frontal collision event can trigger a signal from the first sensor and not the second sensor, causing deployment of the airbag in the first configuration. The impact from an oblique collision event can trigger signals from both the first and second sensors, causing deployment of the airbag into the second configuration.

In some embodiments, the shape or conformation of the airbag 150 differs between the first and second configurations. For example, as shown in FIGS. 2B and 3A, a portion 151 (e.g., an inboard edge) of the airbag 150 can be disposed at a first location in the first configuration, and a second location in the second configuration. In some embodiments, the second location is inboard relative to the first location, with respect to the vehicle. For example, in particular embodiments, the portion 151 (e.g., the inboard edge) of the airbag 150 is disposed at, or otherwise extends to, a location that is at a first distance $L_1$ from the housing 120 in the first configuration (as shown in FIG. 2B), and a second distance $L_2$ in the second configuration (as shown in FIG. 3A). In some embodiments, $L_2$ is greater than $L_1$, and the portion 151 (e.g., inboard edge) of the airbag 150 can be described as being laterally shifted inboard in the second configuration as compared to the first configuration.

The difference between the first and second configurations of the airbag 150 can also be described in relation to the vehicle. For example, a portion 151 of the airbag 150 can be disposed at (or in front of) a first portion of the instrument panel (or dashboard) in the first configuration, and the portion 151 of the airbag 150 can be disposed at (or in front of) a second portion of the instrument panel (or dashboard) in the second configuration. In some embodiments, the second portion comprises a more inboard portion of the instrument panel than the first portion. For example, the second portion can comprise a portion of the instrument panel that is towards the central region of the vehicle.

The shape or conformation of the airbag 150 can also be, at least partially, dependent upon the positioning member 160. For example, the positioning member 160 can be configured to 1) allow the airbag 150 to deploy in a first configuration if the collision event is a frontal collision event, and 2) cause the airbag to deploy in a second configuration if the collision event is an oblique collision event. This is illustrated in FIGS. 2A-2B and 3A-3B, and described in detail below.

Figure 2A:
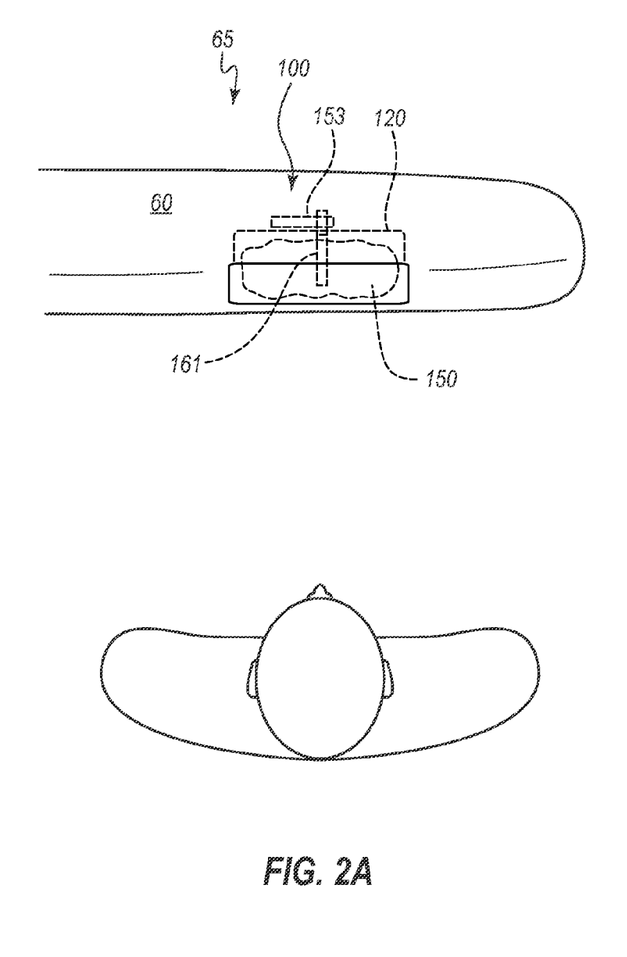
FIG. 2A is a top view of the inflatable airbag system of FIG. 1, depicting the airbag prior to deployment.

FIG. 2A depicts the inflatable airbag system 100 of FIG. 1, prior to deployment. The airbag 150 is in a folded state, and is disposed within the housing 120. The housing 120 is mounted in the instrument panel 60 on the passenger side 65 of a vehicle. Prior to the collision event, the tether 161 is in a coupled state. A first end of the tether 161 is coupled to a first surface (e.g., first inner surface, first inner face, etc.) of the airbag 150. A second end of the tether 161 is coupled to either a second surface of the airbag 150, a coupling member in the housing 120, or a portion of the vehicle (e.g., the instrument panel 60).

In response to a frontal collision event, a signal from the control unit causes the second end of the tether 161 to be cut or otherwise released such that the tether 161 is no longer in a coupled state. The second end of the tether 161 can be cut by a blade (e.g., a tether cutter), or otherwise released from a coupling member 153. With the tether 161 in the uncoupled state, the airbag 150 deploys into the first configuration, substantially unconstrained and unaffected by the tether 161. In some embodiments, the first configuration of the airbag 150 is substantially the same as, or similar to, the conformation of a traditionally deployed frontal airbag.

FIG. 2B depicts the inflatable airbag system 100 of FIG. 1, after deployment of the airbag 150 in the first configuration. The airbag 150 extends in the car-rearward direction, fully deployed and unconstrained. The tether 161 is in an uncoupled state. The first end 162 of the tether 161 is coupled to a first surface 155 of the airbag 150, and the second end 164 of the tether 161 has been cut or otherwise released such that it is no longer coupled or to anything or otherwise secured. In the uncoupled (or inactive) state, the tether 161 does not substantially affect the conformation of the inflated airbag 150.

Deployment of the airbag 150 in the first configuration can be advantageous in frontal collision events where momentum causes the occupant 50 to move in a substantially longitudinal car-forward direction, as indicated by the reference arrow $D_1$. For example, the airbag 150 fully extends in the car-rearward direction (e.g., opposite the car-forward direction $D_1$), minimizing the distance between the occupant 50 and the airbag 150.

FIG. 3A depicts the inflatable airbag system 100 of FIG. 1, after deployment of the airbag 150 in the second configuration. In the second configuration, the tether 161 remains in the coupled state after deployment of the airbag 150. For example, as shown in FIG. 3A, the first end 162 of the tether 161 is coupled to a first surface 155 (e.g., an inner surface) of the airbag 150. In some embodiments, the first surface 155 is an inner surface of the airbag 150 that is disposed at a car-rearward location after the airbag 150 is deployed. The second end 164 of the tether 161 is coupled to a coupling member 153 in the housing 120. As previously mentioned, the second end 164 of the tether 161 can also be coupled to a second surface of the airbag 150, or another portion of the housing, vehicle, or instrument panel.

In the coupled (or active) state, the tether 161 alters the deployed conformation of the airbag 150. For example, in some embodiments, the tether 161 causes the airbag 150 to adopt a wider deployed conformation, as shown in FIG. 3A. The airbag 150 no longer fully extends in the car-rearward direction of the vehicle. Rather, the airbag 150 extends further inboard and outboard relative to the conformation of the airbag 150 in the first configuration. For example, in the second configuration, a portion 151 of the airbag 150 is disposed at a relatively inboard location relative to deployment of the airbag 150 in the first configuration.

Deployment of the airbag 150 in the second configuration can be advantageous in many instances. For example, in oblique collision events, momentum can cause the occupant 50 to move in a substantially oblique direction, as indicated by the reference arrow $D_2$. As shown in FIG. 3A, the oblique direction $D_2$ is between a longitudinal direction $D_3$ (a direction along the longitudinal axis of the vehicle (e.g., a direction that is substantially parallel to the car-forward direction $D_1$ depicted in FIG. 3B)) and a lateral direction $D_4$ (a direction along the lateral axis of the vehicle (e.g., inboard direction)). With traditional frontal airbags, movement of the occupant 50 in an oblique direction often results in injuries to the occupant 50. For example, the occupant 50 often rolls or slides off the inboard side of a traditional airbag and into the center console of the vehicle (i.e., the central region of the instrument panel). These types of injuries are minimized or eliminated by deployment of the airbag 150 into the second configuration, as shown in FIG. 3B.

FIG. 3B depicts the inflatable airbag system 100 of FIG. 1, after deployment of the airbag 150 in the second configuration. The airbag 150 has received an occupant 50 that has moved in an oblique direction. By extending in the inboard direction $D_4$, the airbag 150 is able to protect the occupant 50 from rolling off the airbag 150 and into the center console of the vehicle.

Further, as shown in FIG. 3B, an outer surface 157 (outer face, receiving surface, etc.) of the airbag 150 is substantially flat. By maintaining a substantially flat outer surface 157, the impact and/or force between the airbag 150 and the occupant 50 is minimized.

Figure 4:
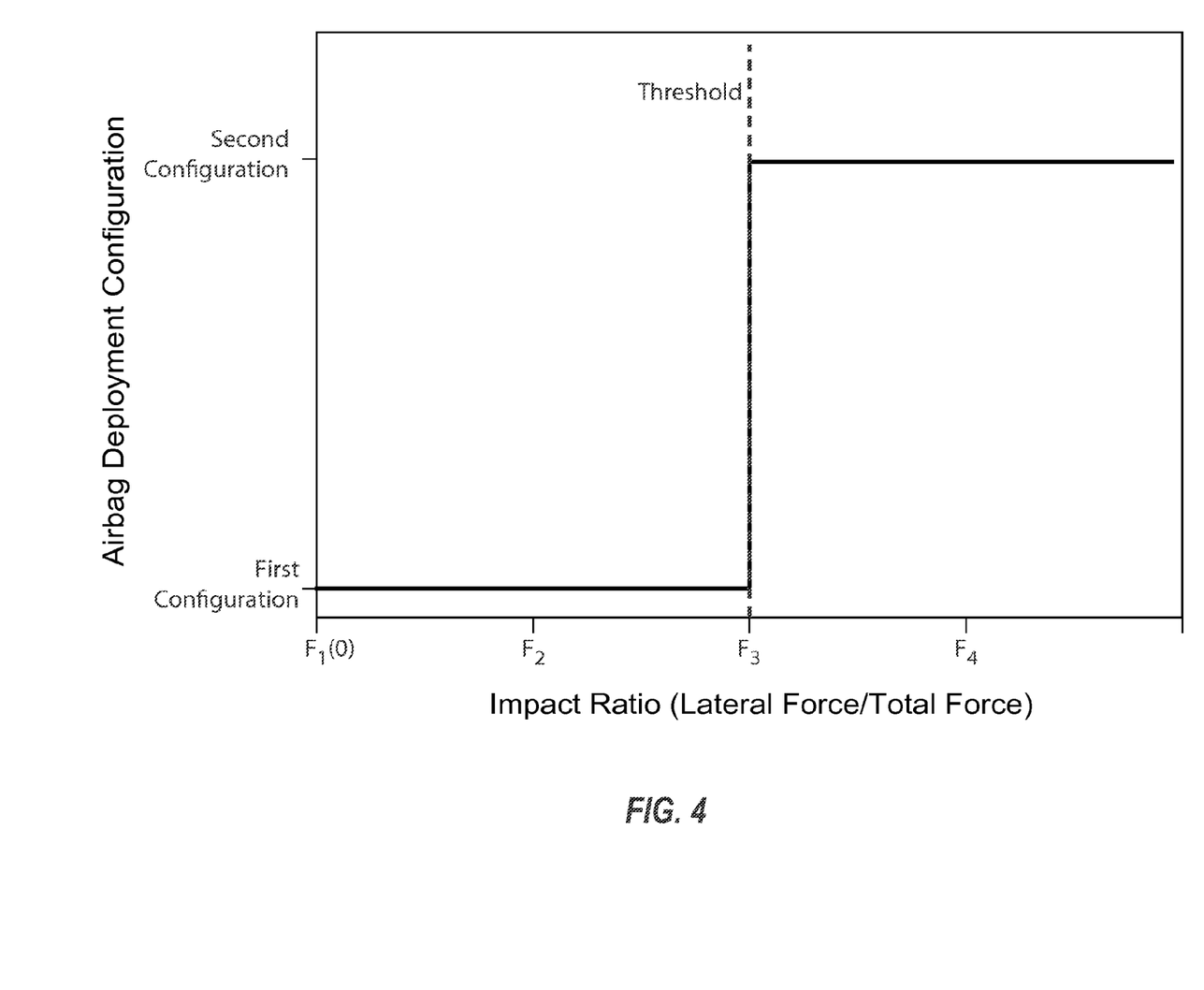
FIG. 4 is a graphical representation of the airbag deployment modes.

FIG. 4 is a graphical representation of the airbag deployment modes. More specifically, FIG. 4 indicates how the airbag will deploy in relation to the impact ratio caused by the collision event. The impact ratio is the ratio between the lateral force and the total force (lateral force+longitudinal force) caused by the collision event. Only longitudinal forces applied to the front of the vehicle are considered, while longitudinal forces applied to the rear of the vehicle are ignored. As can be appreciated, frontal airbags are generally not configured to deploy in response to rear end collisions.

As shown in FIG. 4, a threshold impact ratio exists that determines whether the airbag will deploy in the first or second configuration. For example, at $F_1$, the amount of lateral force on the vehicle is 0. This is a purely frontal collision, and the airbag will deploy in the first configuration. At $F_2$, the impact ratio is below the threshold impact ratio, and the airbag will deploy in the first configuration. At $F_3$, the threshold impact ratio is satisfied, and the airbag will deploy in the second configuration. At $F_4$, the impact ratio is greater than the threshold impact ratio, and the airbag will deploy in the second configuration.

Collision events below the threshold impact ratio can be described as a frontal, or substantially frontal, collision event. Collision events at or above the threshold impact ratio can be described as an oblique collision event. However, as can be appreciated, an upper threshold impact ratio also exists (although not depicted in FIG. 4), wherein the frontal airbag will cease to deploy. At the upper threshold impact ratio, the longitudinal force is negligible and substantially all of the force exerted upon the vehicle is a lateral force (e.g., a side collision).

FIGS. 5A-5B and 6A-6B depict another embodiment of an inflatable airbag system 200. The inflatable airbag system 200 can, in certain respects, resemble components of the inflatable airbag system 100 described in connection with FIGS. 1, 2A-2B, and 3A-3B above. It will be appreciated that the illustrated embodiments may have analogous features. Accordingly, like features are designated with like reference numerals, with the leading digits incremented to "2." (For instance, the airbag is designated "150" in FIGS. 1, 2A-2B, and 3A-3B, and an analogous airbag is designated as "250" in FIGS. 4A-4B and 5A-5B.) Relevant disclosure set forth above regarding similarly identified features thus may not be repeated hereafter. Moreover, specific features of the inflatable airbag system 200 and related components shown in FIGS. 4A-4B and 5A-5B may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the inflatable airbag system 200 of FIGS. 4A-4B and 5A-5B. Any suitable combination of the features, and variations of the same, described with respect to the inflatable airbag system 100 and components illustrated in FIGS. 1, 2A-2B, and 3A-3B, can be employed with the inflatable airbag system 200 and components of FIGS. 4A-4B and 5A-5B, and vice versa. This pattern of disclosure applies equally to further embodiments depicted in subsequent figures and described hereafter.

Figure 5A:
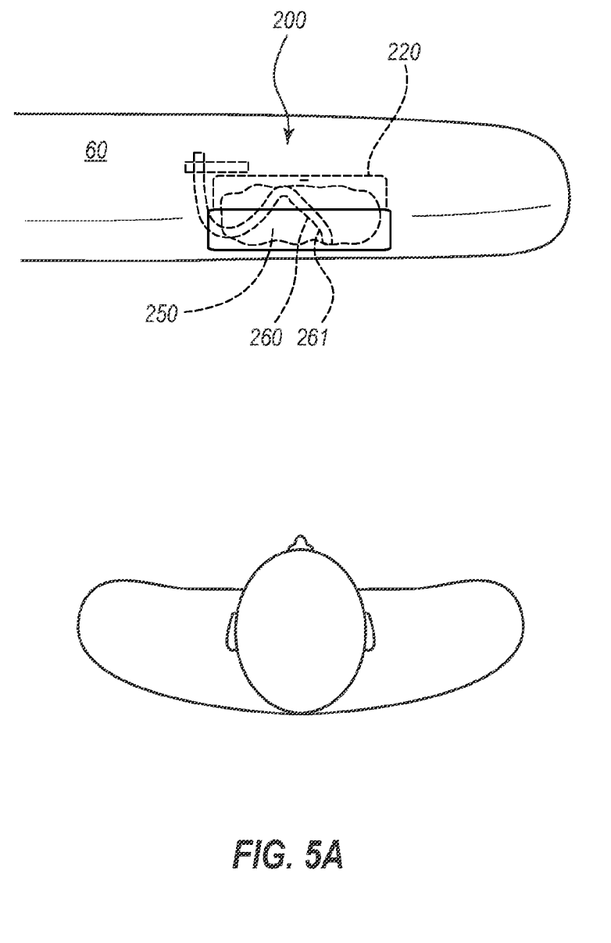
FIG. 5A is a top view of an inflatable airbag system, according to another embodiment of the present disclosure, depicting the airbag prior to deployment.

FIG. 5A depicts an inflatable airbag system 200, according to another embodiment of the present disclosure, illustrating the airbag 250 prior to deployment. The airbag 250 is in a folded state within the housing 220, which is mounted in the instrument panel 60 of a vehicle. As further shown in FIG. 5A, the positioning member 260 comprises a tether 261. Analogous to the embodiment illustrated in FIG. 2A, the tether 261 is in a coupled state prior to a collision event.

Figure 5B:
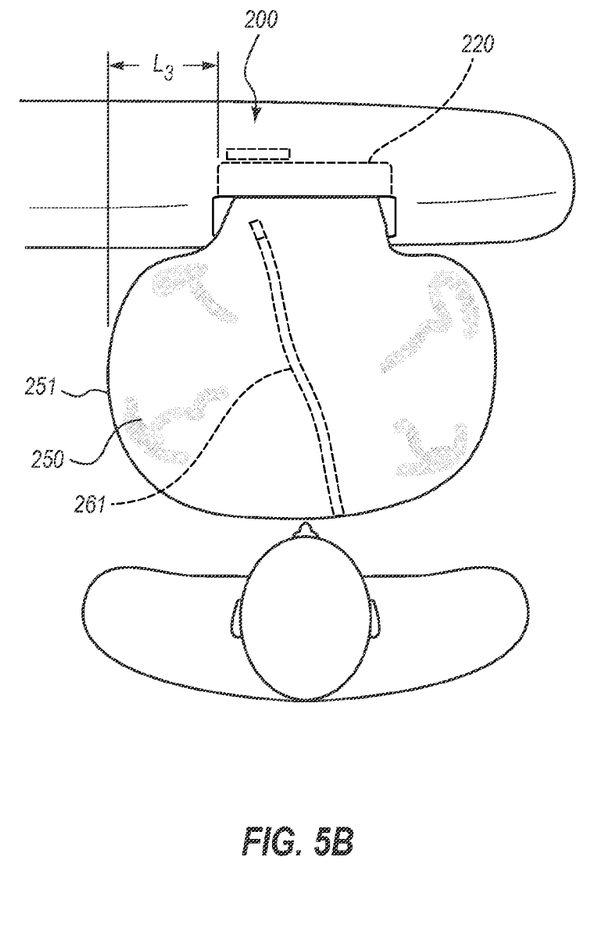
FIG. 5B is another top view of the inflatable airbag system of FIG. 5A, depicting the airbag deployed in a first configuration in response to a frontal collision event.

FIG. 5B depicts the inflatable airbag system 200 of FIG. 5A, after deployment of the airbag 250 in the first configuration. The airbag 250 is fully deployed and the tether 261 is in an uncoupled state. A portion 251 (e.g., inboard edge) of the airbag 250 is disposed at a location that is inboard from the housing 220 at a distance $L_3$. In the uncoupled state, the tether 261 does not substantially alter or affect the conformation of the inflated airbag 250.

Figure 6A:
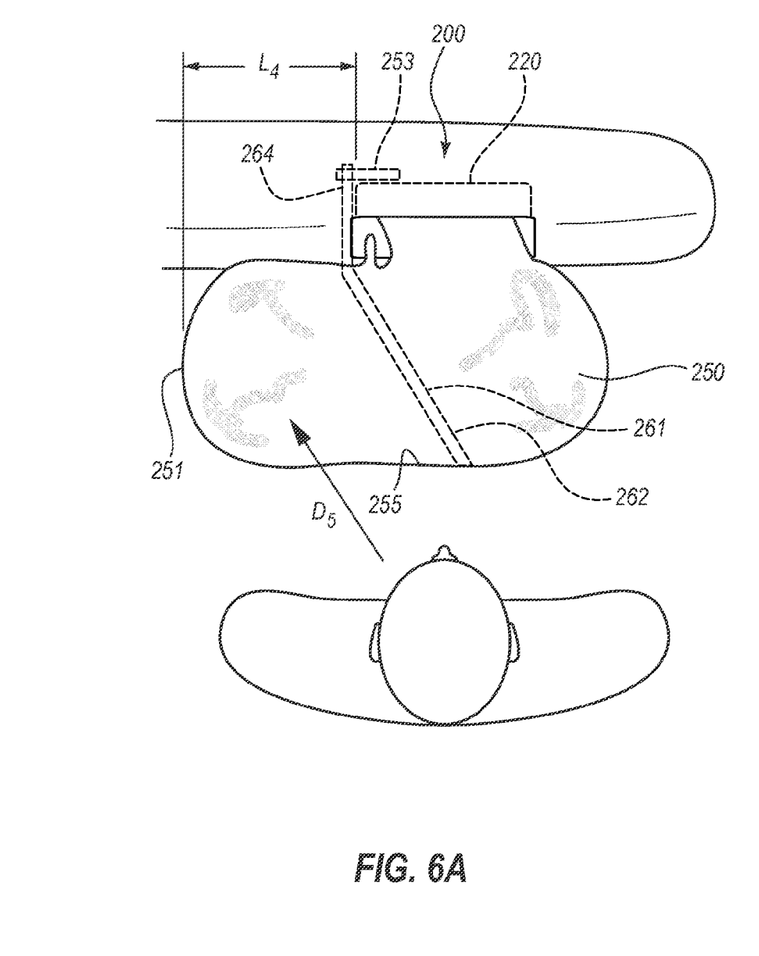
FIG. 6A is a top view of the inflatable airbag system of FIGS. 5A-5B, depicting the airbag deployed in a second configuration in response to an oblique collision event.

FIG. 6A depicts the inflatable airbag system 200 of FIG. 5A, after deployment of the airbag 250 in the second configuration. As set forth above, the airbag 250 is configured to deploy in the second configuration in response to an oblique collision event. In the second configuration, the tether 261 remains in the coupled state after deployment of the airbag 250. In particular, a first end 262 of the tether 261 is coupled a first surface 255 of the airbag 250, and the second end 264 of the tether 261 is coupled to a coupling member 253 in the housing 220.

As shown in FIG. 6A, the tether 261 can pull or rotate the airbag 250 inwardly (or inboard) in the second configuration. For example, in the second configuration, a portion 251 (e.g., inboard edge) of the airbag 250 is disposed at a location that is inboard from the housing 220 at a distance $L_4$. Relative to deployment of the airbag 250 in the first configuration, $L_4$ is greater than $L_3$. Following an oblique collision event, momentum can cause the occupant 50 to move in a substantially oblique direction, as indicated by the reference arrow $D_5$ and into the airbag 250.

Figure 6B:
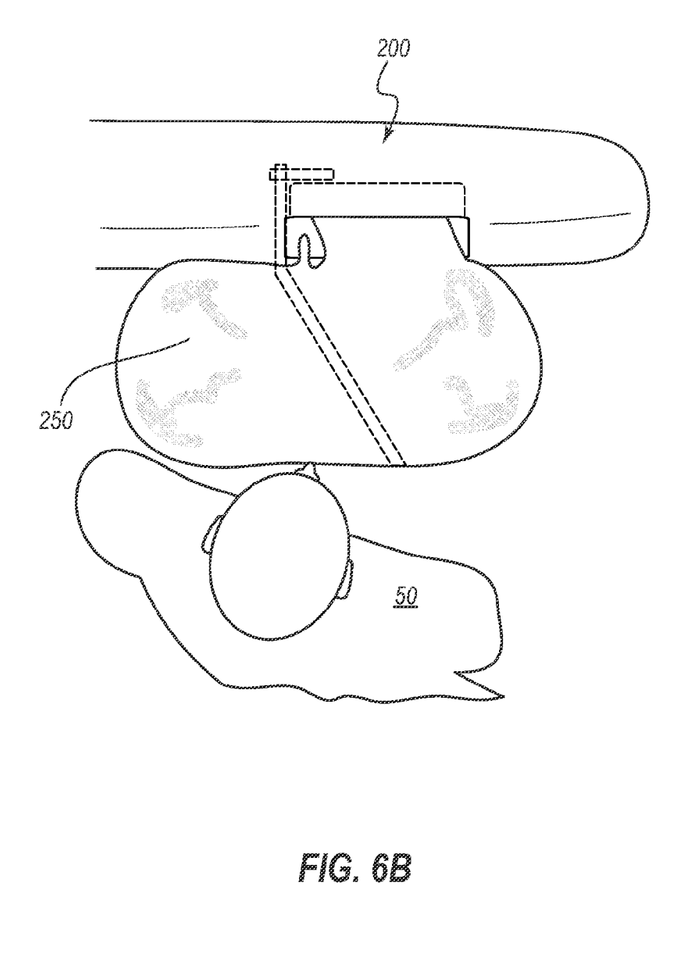
FIG. 6B is another top view of the inflatable airbag system of FIGS. 5A-5B, depicting the airbag deployed in a second configuration in response to an oblique collision event.

FIG. 6B depicts the inflatable airbag system 200 after deployment of the airbag 250 in the second configuration. The airbag 250 has received an occupant 50 that has moved in an oblique direction. By being pulled or rotated inboard, the airbag 250 can protect the occupant 50 from rolling off into the center console of the vehicle.

Figure 7:
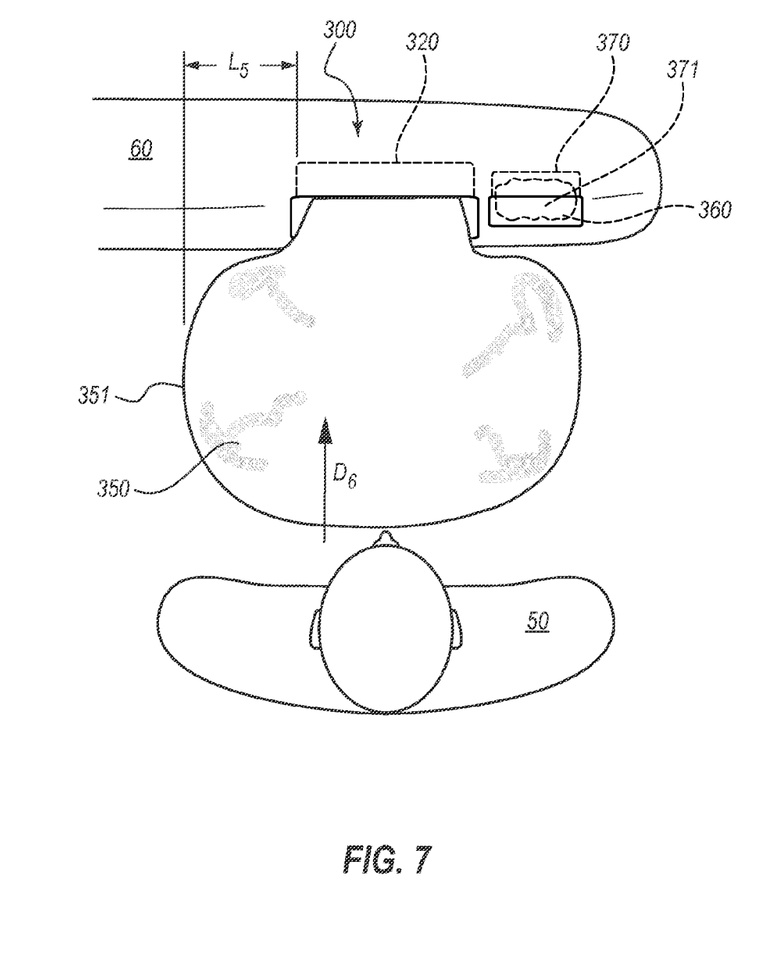
FIG. 7 is a top view of an inflatable airbag system, according to another embodiment of the present disclosure, depicting the airbag deployed in a first configuration in response to a frontal collision event.

FIG. 7 depicts an inflatable airbag system 300, according to another embodiment of the present disclosure, illustrating the airbag 350 deployed in a first configuration. The inflatable airbag system 300 comprises an airbag 350, a housing 320, and a positioning member 360. In some embodiments, such as the illustrated embodiment, the positioning member 360 comprises an inflatable member 371.

As shown in FIG. 7, the inflatable member 371 can be disposed in a second housing 370 within the instrument panel 60 of a vehicle. In some embodiments, the second housing 370 is disposed on the outboard side of the instrument panel 60 relative to the airbag housing 320. In other embodiments, the inflatable member 371 can be disposed in the airbag housing 320 with the airbag 350.

In the first configuration, the inflatable member 371 is inactive (or not activated or not inflated) and does not substantially alter or affect the conformation of the inflated airbag 350. Rather, the airbag 350 is fully deployed in an unconstrained conformation. A portion 351 (e.g., inboard edge) of the airbag 350 is disposed at a location that is inboard from the housing 320 at a distance $L_5$. The occupant 50 can move in a substantially longitudinal car-forward direction, as indicated by the reference arrow $D_6$, and into the airbag 350.

Figure 8A:
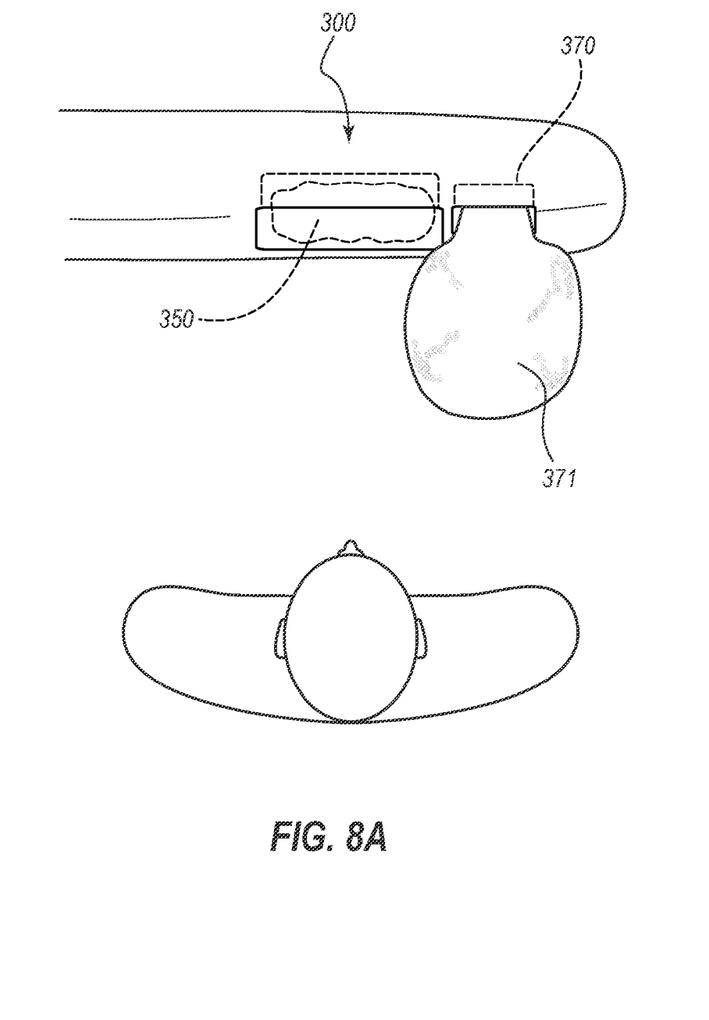
FIG. 8A is a top view of the inflatable airbag system of FIG. 7, depicting the positioning member deployed in response to an oblique collision event.

FIG. 8A depicts the inflatable airbag system 300 of FIG. 7, illustrating the inflatable member 371 in the active (or activated/inflated) state. In some embodiments, the control unit sends a signal to activate the inflatable member 371 in response to an oblique collision event. When activated, the inflatable member 371 is deployed from the second housing 370 and extends in the car-rearward direction of the vehicle. In some embodiments, the inflatable member 371 is activated and inflated prior to deployment of the airbag 350. In other embodiments, the inflatable member 371 is activated and inflated while the airbag 350 is deployed. In yet other embodiments, the inflatable member 371 is activated and inflated after deployment of the airbag 350.

Figure 8B:
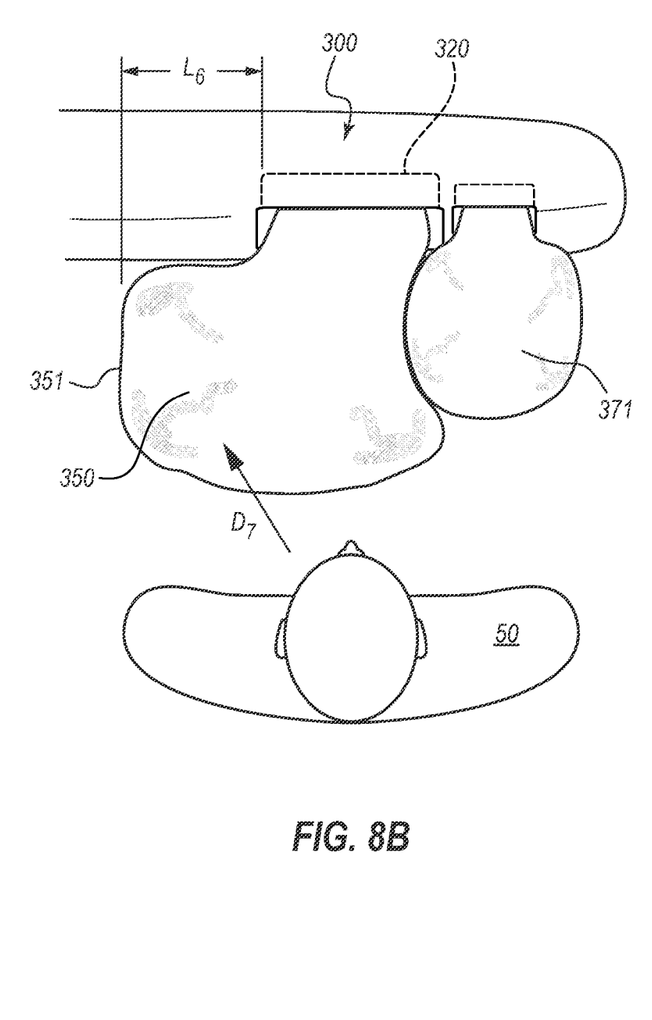
FIG. 8B is another top view of the inflatable airbag system of FIG. 7, depicting the airbag deployed in a second configuration in response to an oblique collision event.

FIG. 8B depicts the inflatable airbag system 300 of FIG. 7, after deployment of the airbag 350 in the second configuration. As shown in FIG. 8B, in some embodiments, the conformation of the airbag 350 in the second configuration is at least partially dependent upon an interaction between the airbag 350 and the inflatable member 371. For example, the inflatable member 371 forces the deployed airbag 350 in the inward or inboard direction. In particular, a portion 351 (e.g., inboard edge) of the airbag 350 is disposed at a location that is inboard from the housing 320 at a distance $L_6$. Relative to deployment of the airbag 350 in the first configuration, $L_6$ is greater than $L_5$. In the second configuration, the airbag 350 is ready to receive an occupant 50 moving in an oblique direction, as indicated by the reference arrow $D_7$.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag system that is configured to be mounted to a frontal region of a vehicle, the inflatable airbag system comprising:
   an airbag cushion configured to deploy in response to a collision event; and
   a positioning member configured to allow the airbag cushion to deploy in a first configuration if the collision event is a frontal collision event and to cause the airbag cushion to deploy in a second configuration if the collision event is an oblique collision event, wherein the positioning member comprises a single tether,
   wherein a central portion of the airbag cushion is configured to be disposed at a first location in the first configuration and a second location in the second configuration, the second location being inboard relative to the first location with respect to the vehicle in which the inflatable airbag system is configured to be mounted, and
   wherein the central the portion of the airbag cushion is configured to be disposed at the second location in response to an interaction between the airbag cushion and the positioning member.

2. The inflatable airbag system of claim 1, wherein the frontal region comprises an instrument panel of a vehicle.

3. The inflatable airbag system of claim 1, wherein the tether is in an uncoupled state when the airbag cushion is in the first configuration and a coupled state when the airbag cushion is in the second configuration.

4. The inflatable airbag system of claim 1, wherein the tether does not affect the conformation of the airbag cushion in the first configuration.

5. The inflatable airbag system of claim 1, wherein an outboard facing edge of the airbag cushion is configured to be disposed at a third location in the first configuration and a fourth location in the second configuration, the fourth location being inboard relative to the third location with respect to the vehicle in which the inflatable airbag system is configured to be mounted.

6. The inflatable airbag system of claim 1, wherein in the second configuration the tether is configured to extend from a car-forward location to a car-rearward location at an angle that is towards an outboard direction of the vehicle in which the inflatable airbag system is configured to be mounted.

7. An inflatable airbag system that is configured to be mounted to a frontal region of a vehicle, the inflatable airbag system comprising:
   an airbag cushion configured to deploy in response to a collision event; and
   a positioning member that is configured to allow the airbag cushion to deploy in a first configuration if the collision event is a frontal collision event and to cause the airbag cushion to deploy in a second configuration if the collision event is an oblique collision event, wherein the positioning member comprises a single tether, wherein the positioning member is in a coupled state prior to the collision event, the positioning member being configured to uncouple if the collision event is a frontal collision event and remain in the coupled state if the collision event is an oblique collision event, wherein in the second configuration the tether is configured to extend from a car-forward location to a car-rearward location at an angle that is towards an outboard direction of the vehicle in which the inflatable airbag system is configured to be mounted.

8. The inflatable airbag system of claim 7, wherein the tether does not affect the shape of the airbag cushion when it is uncoupled.

9. The inflatable airbag system of claim 7, wherein the positioning member is configured to cause a central portion of the airbag cushion to be disposed in a second location in the second configuration, the second location being inboard relative to a first location where the central portion of the airbag is configured to be disposed in the first configuration.

10. The inflatable airbag system of claim 7, wherein an outboard facing edge of the airbag cushion is configured to be disposed at a first location in the first configuration and a second location in the second configuration ,the second location being inboard relative to the first location with respect to the vehicle in which the inflatable airbag system is configured to be mounted.

* * * * *